US011828153B2

(12) United States Patent
Capela Moraes et al.

(10) Patent No.: US 11,828,153 B2
(45) Date of Patent: Nov. 28, 2023

(54) FACILITY AND METHOD FOR UNDERWATER DISPOSAL OF THE WATER PRODUCED DURING UNDERWATER PRODUCTION OF HYDROCARBONS AT GREAT DEPTHS

(71) Applicant: SAIPEM S.A., Montigny le Bretonneux (FR)

(72) Inventors: Carlos Alberto Capela Moraes, Saint-Cloud (FR); Raymond Hallot, Voisins le Bretonneux (FR); Nicolas Chazot, Gif sur Yvette (FR)

(73) Assignee: SAIPEM S.A., Montigny le (FR)

( * ) Notice: Subject to any disclaimer, the term of this patent is extended or adjusted under 35 U.S.C. 154(b) by 114 days.

(21) Appl. No.: 17/610,347

(22) PCT Filed: Apr. 28, 2020

(86) PCT No.: PCT/FR2020/050722
§ 371 (c)(1),
(2) Date: Nov. 10, 2021

(87) PCT Pub. No.: WO2020/234520
PCT Pub. Date: Nov. 26, 2020

(65) Prior Publication Data
US 2022/0220838 A1 Jul. 14, 2022

(30) Foreign Application Priority Data
May 23, 2019 (FR) ........................ 1905435

(51) Int. Cl.
E21B 43/36 (2006.01)
B01D 17/02 (2006.01)
(Continued)

(52) U.S. Cl.
CPC .......... *E21B 43/36* (2013.01); *B01D 17/0214* (2013.01); *B01D 21/10* (2013.01);
(Continued)

(58) Field of Classification Search
CPC ..... E21B 43/36; B01D 17/0214; B01D 21/10; B01D 21/2444; B01D 21/2472; C02F 1/40; C02F 2101/32; C02F 2103/10
See application file for complete search history.

(56) References Cited

U.S. PATENT DOCUMENTS 5,580,463 A * 12/1996 Hubred ................. B03D 1/028
210/708
8,273,151 B2 9/2012 Miotto et al.
(Continued)

FOREIGN PATENT DOCUMENTS

WO 2009050367 A2 4/2009
WO 2011161343 A1 12/2011
(Continued)

OTHER PUBLICATIONS

Search Report from corresponding French Application No. FR1905435, dated Feb. 10, 2020.
(Continued)

Primary Examiner — Matthew R Buck
(74) Attorney, Agent, or Firm — WORKMAN NYDEGGER

(57) ABSTRACT

A facility for the subsea disposal of the water produced during deepwater hydrocarbon production, includes a subsea oil/water separation station fed with fluids coming directly from at least one hydrocarbon production well, operating at a pressure independent of and lower than the ambient pressure, and comprising an oil outlet for connecting to a production unit and a water outlet, a flat gravity oil/water separation tank resting on the seabed, continuously fed with
(Continued)

water leaving the oil/water separation station, operating at a pressure substantially equal to the ambient pressure, and comprising an oil outlet for connecting to the production unit and a water outlet, and a subsea high-pressure pump connected to the water outlet of the oil/water separation station and to a water inlet of the tank to raise the pressure of the water leaving the oil/water separation station to the ambient pressure before it is admitted into the tank.

23 Claims, 13 Drawing Sheets

(51) Int. Cl.
*B01D 21/00* (2006.01)
*C02F 1/40* (2023.01)
*B01D 21/02* (2006.01)
*B01D 21/24* (2006.01)
*E21B 41/00* (2006.01)
*C02F 101/32* (2006.01)
*C02F 103/10* (2006.01)

(52) U.S. Cl.
CPC ..... *B01D 21/2444* (2013.01); *B01D 21/2472* (2013.01); *C02F 1/40* (2013.01); *E21B 41/005* (2013.01); *C02F 2101/32* (2013.01); *C02F 2103/10* (2013.01)

(56) References Cited

U.S. PATENT DOCUMENTS

| | | |
|---|---|---|
| 9,080,442 B2 | 7/2015 | Abrand et al. |
| 2010/0212492 A1 | 8/2010 | Miotto et al. |
| 2013/0092633 A1 | 4/2013 | Abrand et al. |
| 2018/0179878 A1* | 6/2018 | Sund ............... C02F 1/40 |
| 2019/0010796 A1* | 1/2019 | De Freitas ......... B01D 17/0214 |

FOREIGN PATENT DOCUMENTS

| | | | |
|---|---|---|---|
| WO | 2016178985 A1 | 11/2016 | |
| WO | WO-2020080951 A1 * | 4/2020 | ......... B01D 17/0205 |

OTHER PUBLICATIONS

International Search Report and Written Opinion from PCT Application No. PCT/FR2020/050722, dated Sep. 21, 2020.

\* cited by examiner

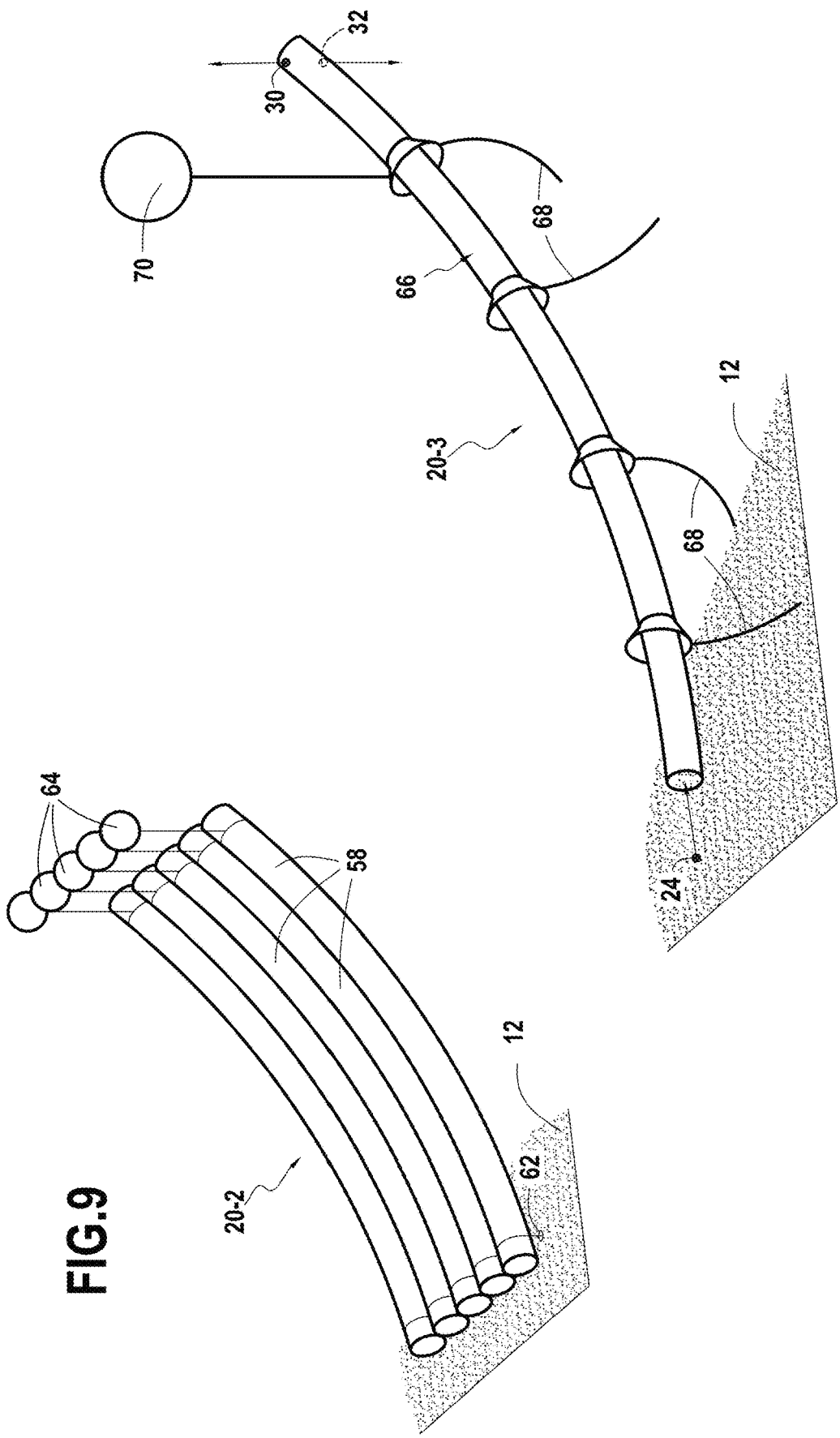

FACILITY AND METHOD FOR UNDERWATER DISPOSAL OF THE WATER PRODUCED DURING UNDERWATER PRODUCTION OF HYDROCARBONS AT GREAT DEPTHS

TECHNICAL FIELD

The present invention relates to the general field of deepwater production of hydrocarbons, in particular oil and gas. More precisely, it relates to the disposal of the water produced during such subsea hydrocarbon production.

PRIOR ART

In current configurations for deepwater hydrocarbon production, the configuration generally chosen is that of connecting subsea production wells, directly or via a subsea manifold, to a floating production plant.

This plant generally consists of a floating production storage and offloading (FPSO) unit to a tanker that is permanently moored at a fixed location on the sea surface, near the subsea production field.

The FPSO, with primary production facilities on its deck, usually performs the separation and treatment of the production fluids (gas, oil and produced water). Concerning the latter fluid, the conventional surface treatment facility consists of deoiling hydrocyclones, optionally supplemented by a degassing and/or flotation unit to allow its discharge into the sea with a reduced oil content (usually below 30 ppm).

Conventional surface produced water treatment systems require extensive maintenance and servicing to ensure proper operation in order to achieve the required water quality for discharge into the sea. Due to the requirements of these operations and the nature of this equipment (adjusting the number of hydrocyclones to the produced water flow to be treated to maximize efficiency, periodic backwashing to clean the discharge ports, etc.) and their maintenance (periodic batch injection of washing liquids or even disassembly of hydrocyclone units for mechanical scale removal, etc.), and frequent operational problems when these operations are not properly performed, some operators have studied and implemented water storage tanks on the FPSO to treat produced water, instead of or in addition to the conventional produced water treatment plant.

In this case, the water produced is discharged into these large tanks, which provide a very long residence time, in order to promote the floating of dispersed oil droplets carried along solely by the action of gravity, during this long residence time. These large tanks, without internal elements, act as separators by the action of gravity, and are unlikely to cause operating or maintenance problems for the operators, and eventually the water will reach the required quality to be discharged into the sea or reinjected into the tank.

Furthermore, in contrast to this usual production configuration, it has been considered that subsea disposal of produced water from oil production fields, particularly at significant depths and high produced water contents, can significantly increase oil production due to the reduction in wellhead pressure by disposing of the water column in the riser to the production unit (the FPSO).

The reduction in wellhead pressure due to subsea water disposal can be significant and is greatest for greater water depths and high produced oil water contents. This condition of increasing produced oil water content is very common in most oil production fields, in particular during the latter part of the production life, when the aquifer tends to reach the production wells.

Currently, treatment systems for the subsea disposal of produced water from oil fields are typically composed of hydrocyclones. However, the use of subsea separators, which are typically employed on the surface to separate bulk water from produced oil under conditions, is not at all recommended in the deep sea due to the necessary wall thickness and material requirements of the external pressure, making such a solution uneconomical.

Moreover, conventional water treatment equipment, such as hydrocyclones and compact flotation units, are expensive because of the operating and maintenance requirements, even in surface facilities where they are common. This operating feature contributes to the reduced availability of such equipment installed on the seabed where direct maintenance is impossible. Clogging problems in the small openings of such equipment can be difficult to solve in a subsea application, and this could lead to lower system availability, in particular in the case where a recovery procedure for cleaning has to be implemented.

It has also been considered to use flexible polymer bags for the subsea storage of produced water. As described for example in the document WO2016/178985, a flexible membrane tank inside a conventional subsea steel tank shape is used for storage of production fluids (oil and produced water). The objective mentioned in this document is to receive produced water even from the surface side to perform batch processing on the seabed—disposal of solids and oil. The disposal of solids is carried out by means of recovering the bladder and replacing it with a new one.

This subsea produced water disposal treatment is also unsatisfactory. In particular, it is not suitable for continuous treatment of produced water because the tank is deformable and therefore has a variable volume of water and a variable residence time of the water, which implies that it must be regularly emptied with all the disadvantages that this presents (in particular that of having to stop production). Moreover, the disposal of the solids deposited at the bottom of the tank requires the recovery of the bladder in order to empty and replace it, which is tedious.

DISCLOSURE OF THE INVENTION

The primary aim of the present invention is therefore to provide a facility and a process for the subsea disposal of produced water which does not have the above-mentioned disadvantages.

In accordance with the invention, this aim is achieved by a facility for the subsea disposal of the water produced during deepwater hydrocarbon production, comprising:

a subsea oil/water separation station fed with fluids coming directly from at least one hydrocarbon production well, operating at a pressure independent of and lower than the ambient pressure, and comprising an oil outlet for connecting to a production unit and a water outlet;

a flat gravity oil/water separation tank resting on the seabed, continuously fed with water leaving the oil/water separation station, operating at a pressure substantially equal to the ambient pressure, and comprising an oil outlet for connecting to the production unit and a water outlet; and a subsea high-pressure pump connected, on the one hand, to the water outlet of the oil/water separation station and, on the other hand, to a water inlet of said tank to raise the pressure of the water leaving the oil/water separation station to the ambient pressure before it is admitted into said tank.

The facility according to the invention is remarkable in particular in that it combines a subsea oil/water separation station operating at the outlet pressure of the production wells (i.e., at a pressure lower than the ambient pressure) with a gravity oil/water separation tank resting on the seabed. Moreover, the tank operates at ambient pressure (i.e., at the subsea hydrostatic pressure on the seabed), which facilitates its construction, reduces its installation costs and makes it particularly reliable and robust during operation (i.e., with virtually no possible operational failures compared with conventional hydrocyclone-type systems).

More precisely, the flat tank design is not restrictive in terms of manufacturing, given that it is sized to be installed and to operate on the seabed at all times and while in pressure equilibrium with the external hydrostatic pressure. Also, the loads on the tank are considerably reduced, which allows the use of thin walls with all the advantages that this provides in terms of manufacturing and installation.

In other words, thanks to this pressure equilibrium, the tank walls are not subject to any differential pressure between the inside and the outside environment, which allows the use of very thin walls (since there is no requirement for resistance to collapse or bursting). The sizing of the tank is based on mechanical loads due to manufacturing, transport and installation sequences, since there are no mechanical loads other than the submerged dead weight, which will act on the structure once it is installed and in operation. Thus, the design and manufacturing, transport and installation procedures are designed to minimize the duration of mechanical stresses so as to lead to a very light economical solution.

"Flat" tank is understood to mean that the tank has a geometric configuration that allows a long residence time of the produced water, a low migration path for the oil droplets present in the water and a large oil/water interface area in order to promote oil/water separation by gravity.

In certain configurations, a flat tank leads to a low tank height and large tank area. Such a low tank height and large tank area configuration, together with its thin walls, leads to a very low support load and helps to avoid any special foundation requirements at the installation site. A light floor foundation resting on the seabed is suitable for virtually any seabed condition, provided it has been properly graded. This configuration also simplifies dismantling at the end of the structure's life.

The produced water effluent from the oil field effluent water phase separation station enters the tank and moves through it at a very slow rate and remains inside the tank for a significant period of time (at least two orders of magnitude longer than in the separation station). This means that the tank has a very large volume to allow its use in line with the field production, in a continuous operation mode, with a long residence time (typically a minimum of 1 day).

Furthermore, the low geometry of the tank provides a reduced cross-sectional area facing the sea currents (assumed to be parallel to the seabed) and helps to reduce the longitudinal loads on its structure. Its large surface area and flat shape lead to a reduced cross-sectional moment of inertia, allowing for flexibility and bending under the action of vertical loads due to swell when brought to site in a floating tow. After installation no fatigue loading is expected, as the structure rests on the seabed and these cyclic loads no longer act.

Moreover, the low tank geometry feature leads to very good, produced water quality by reducing the oil droplet release path and providing a high ratio of oil/water interface area to fluid volume, and improves the creaming process (by floating dispersed oil droplets) under the action of gravity compared with corresponding surface gravity separators Thus, the present invention utilizes equipment that combines high reliability, improved efficiency of gravity oil/water separation (by subjecting the produced water stream to a long residence time in the tank under the action of gravity), and a simple, economical and robust configuration. The large size of the tank (sized for the maximum produced water flow expected over the life of the subsea oil field) ensures high robustness with respect to fluid inlet conditions. Unlike alternative solutions that rely on equipment with reduced volumetric inertia (based on hydrocyclones or compact flotation units, for example), possible oil blockages—due to malfunctioning and/or malfunctioning of the upstream oil-water separator—are quickly separated once they have reached the inside of the tank, thanks to the stability of these large oil globules obtained by the very smooth flow conditions inside the tank and their high floating velocity.

Applied to deepwater oil fields (depths greater than 700 meters) with a growing increase in water content production, the present invention thus substantially increases oil production due to the reduction of the wellhead pressure by disposing of the water column in the riser to the production unit. The greater the depths and the higher the water content of the produced oil, the more significant the reduction in wellhead pressure may be.

The tank may further comprise, at the top, an oil droplet collection device opening toward the oil outlet of the tank. In this case, the tank advantageously further comprises, at the top, means for periodically discharging the oil present at the level of the collection device. These means for periodically discharging the oil droplets may comprise a network of suction pipes controlled by an on-off valve capable of opening into the collection device.

The tank may further comprise, at the bottom, means for collecting and periodically discharging any solid particles deposited on a floor of the tank. In this case, the means for collecting and discharging solid particles advantageously comprise a network of suction pipes controlled by a valve, and nozzles for injecting pressurized water toward the floor of the tank.

The oil outlet of the tank can be connected to the oil outlet of the separation station via at least one on-off valve. Similarly, the water outlet of the tank can open into the sea via a low-pressure pump or open into a water injection well via a high-pressure pump.

According to an embodiment, the tank has a cylindrical shape with a flat floor, an upwardly sloping roof to facilitate the collection of oil droplets, a water inlet which opens into the tank at the center thereof via a cyclonic device to impose an initial rotation speed on the water admitted into the tank, an oil outlet which is positioned at the level of the sloping roof, and a water outlet which comprises a plurality of scoops formed at the periphery of the tank and opening into the tank in tangential directions.

According to another embodiment, the tank has a plurality of pipes of large diameter and long length arranged parallel to each other, resting on a seabed, the water inlet of the tank being at a same inlet end of each pipe, and the oil outlet and the water outlet of the tank being at a same opposite outlet end of each pipe.

In this embodiment, if the seabed on which the tank rests has a horizontal slope, the pipes rest on the seabed so that their outlet end is tilted upwards relative to their inlet end.

Alternatively, if the seabed on which the tank rests is horizontal, the pipes rest on the seabed via tilting means so that their outlet end is tilted upwards relative to their inlet end.

In this case, the tilting means may comprise supports giving a tilt to the tank pipes resting thereon. Alternatively, they may comprise systems for anchoring to the seabed the inlet end of the pipes and float systems connected to the outlet end of the pipes to tilt them upwards relative to the inlet ends.

According to yet another embodiment, the tank may have a pipe of large diameter and very long length, the water inlet of the tank being at an inlet end of the pipe which is anchored to the seabed, and the oil outlet and the water outlet of the tank being at the opposite outlet end of the pipe which is connected to floats to give the pipe a catenary shape.

In these latter two embodiments, each pipe may have a loop, serpentine or spiral shape.

According to yet another embodiment, the pipe comprises a single pipe forming a helix, the water inlet of the tank being at one inlet end of the pipe, and the oil outlet and the water outlet of the tank being at the opposite outlet end of the pipe.

According to yet another embodiment, the tank comprises a plurality of channels of parallelepipedal cross-section which are arranged in a helix, the water inlet of the tank being at the same inlet end of each channel, and the oil outlet and the water outlet of the tank being at the same opposite outlet end of each channel.

According to yet another embodiment, the tank comprises a plurality of identical tiles each in the form of a dihedral, inclined at 30° to the horizontal, and arranged in several series of tiles.

Preferably, the high-pressure pump is a multi-stage coalescing pump which prevents shearing of the dispersed oil droplets by the action of the centrifugal pump, and thus further improves the water treatment.

Another subject matter of the invention is a process for the subsea disposal of water produced during deepwater hydrocarbon production, comprising feeding fluids coming directly from at least one hydrocarbon production well to a subsea oil/water separation station operating at a pressure independent of and lower than the ambient pressure, and continuously feeding a flat gravity oil/water separation tank resting on the seabed with produced water leaving the oil/water separation station, the produced water feeding the tank having first been pressurized to reach a pressure substantially equal to the ambient pressure.

BRIEF DESCRIPTION OF THE DRAWINGS

FIG. 9 is another alternative embodiment of the tank of FIG. 7;

FIG. 10 shows a tank of a subsea produced water disposal facility according to yet another embodiment of the invention;

DESCRIPTION OF THE EMBODIMENTS

The invention applies to deepwater (i.e., greater than 700 meters) production and processing of hydrocarbons, in particular oil and gas, from oil fields with a growing increase in water content production. More precisely, it relates to the disposal (or treatment) of water content from the produced oil.

Increasing the water content of the produced oil has become very common in most oil production fields, in particular during the latter part of the operating life, when the aquifer tends to reach the production wells.

Figure 1:
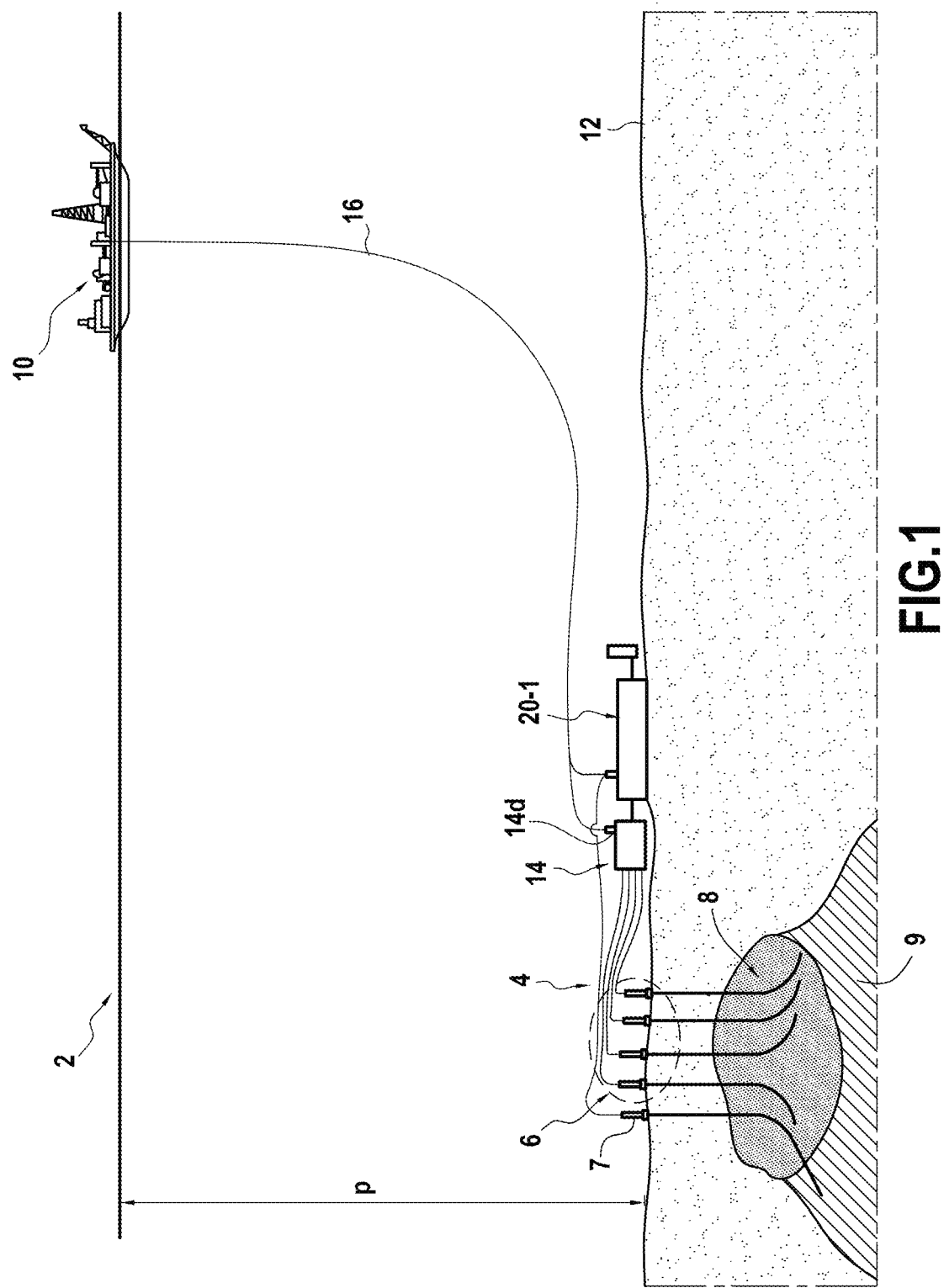
FIG. 1 is a schematic view of a deepwater hydrocarbon production facility to which the invention applies.

FIG. 1 shows an example of a deepwater hydrocarbon production facility 2 from an oil production field 4.

Typically, an oil production field 4 is operated at a water depth p comprised between 1000 m and 3000 m. It consists of a plurality of hydrocarbon production wells 6 for collecting oil and gas from an oil reservoir 8 in the reservoir rock, and optionally at least one produced water injection well 7 in the aquifer 9.

The extracted hydrocarbons are typically sent to a surface production unit 10, for example a floating production storage and offloading (FPSO) unit, via subsea pipes and risers 16.

Before being sent to the production unit 10, the hydrocarbons extracted from the oil reservoir 8 are treated at the seabed 12 to, in particular, separate the produced oil from the water contained therein.

To this end, the subsea hydrocarbon production facility 2 comprises a subsea oil/water separation station 14 which is fed with fluids from the hydrocarbon production wells 6.

According to the invention, this oil/water separation station 14 operates at a pressure independent of and lower than the ambient pressure. This operating pressure is defined by the operator during crude oil flow and reservoir rock simulation studies. It is optimal for improving oil recovery. By way of example, for a water depth p of about 2000 meters, the operating pressure of the oil/water separation station can be of the order of 80 bars (the ambient pressure at this depth being 200 bars).

Different types of subsea oil/water separation station may be used. In particular, as shown in more detail in FIG. 2, a modular liquid/liquid gravity separation device may be used consisting of a plurality of pipes without internal elements forming parallel loops 14a (called coils) which can be installed on the seabed due to the fact that their reduced diameter provides a high resistance to external/internal differential pressure.

An example of such a modular liquid/liquid gravity separation device is described in the publication WO 2011/161343 on behalf of the Applicant. The long length and the circular cross-section of the pipes of this separation device allow for high differential pressure resistance in a relatively low weight configuration. Moreover, its modular configuration allows flexible installation conditions, even for high-capacity systems (high inlet flow). Thus, this device allows the primary separation of bulk raw water at any desired pressure, in particular at low pressure, independent of the ambient pressure (water depth).

Figure 2:
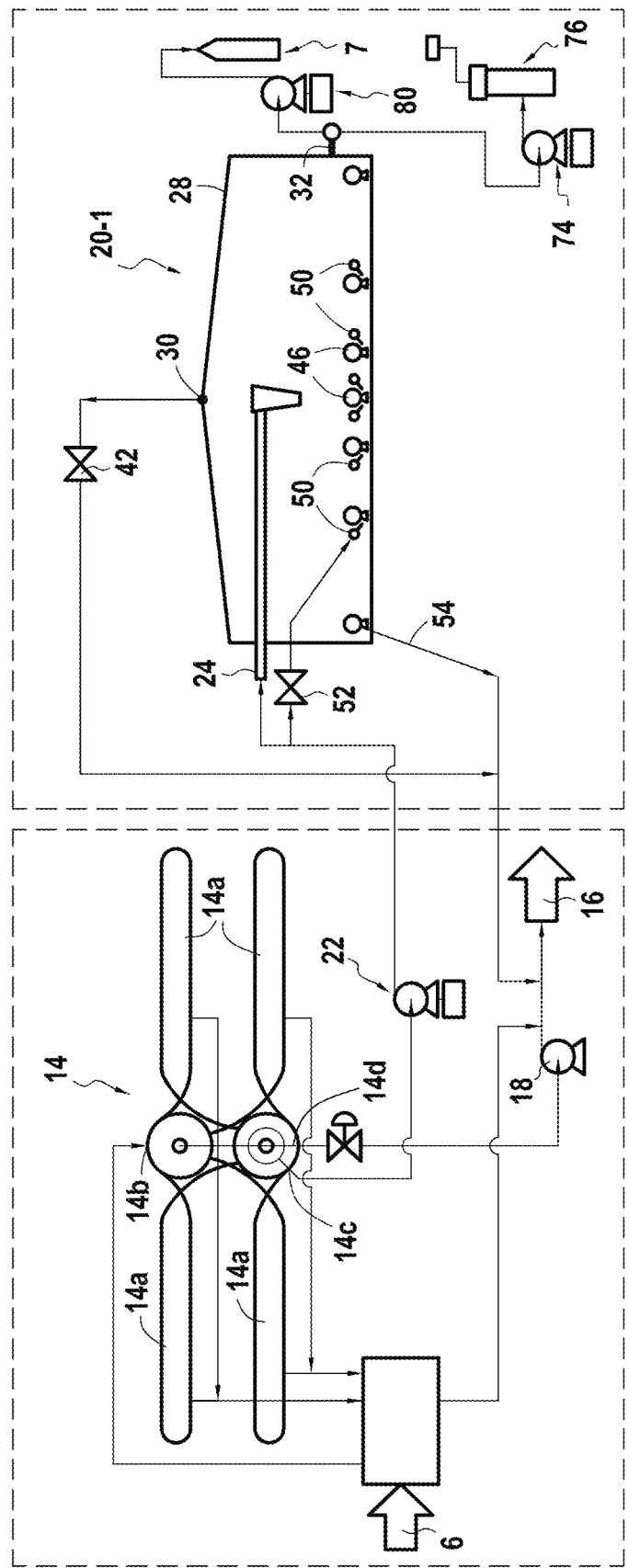
FIG. 2 shows a subsea produced water disposal facility according to an embodiment of the invention.
Figure 3:
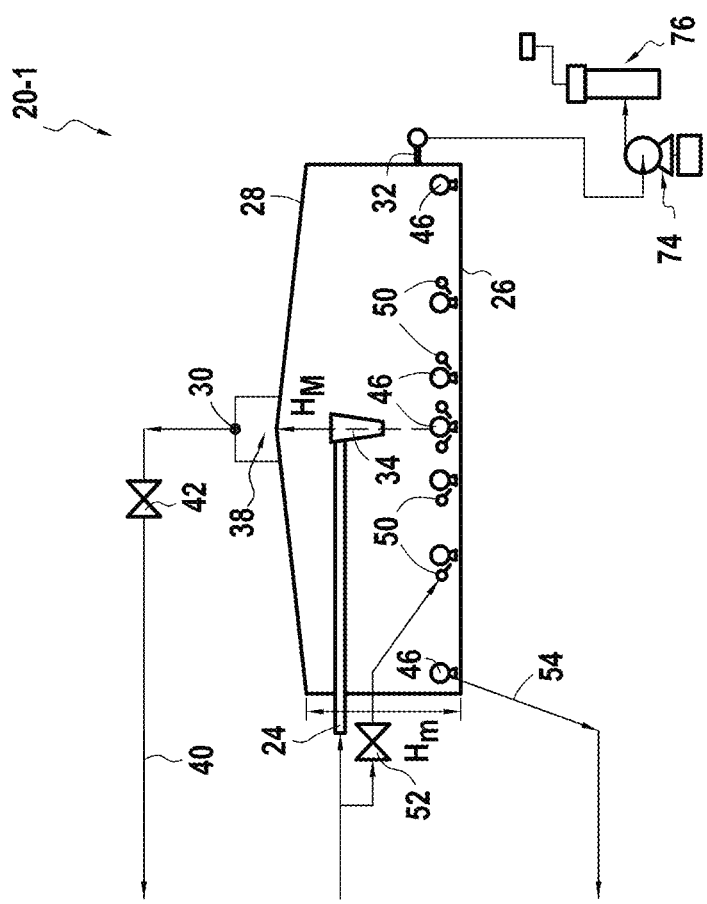
FIG. 3 is a side view of the tank of the facility of FIG. 2.

As shown in FIG. 2, the subsea oil/water separation station 14 further comprises a hydrocarbon inlet 14b, and an oil (and gas) outlet 14c which is connected to the production unit 10 at the surface via a riser 16 (and optionally by means of a pump 18).

The subsea oil/water separation station 14 further comprises a water outlet 14d which is for connecting to a flat gravity oil/water separation tank 20-1 resting on the seabed 12.

More precisely, the feed of water from the subsea oil/water separation station 14 is provided by means of a subsea high-pressure pump 22 which is connected, on the one hand, to the water outlet 14d of the oil/water separation station 14 and, on the other hand, to a water inlet 24 of said tank.

The low, flat tank 20-1 is a produced water treatment system located downstream of the oil/water separation station 14. This system, which is described in detail below, operates at a pressure substantially equal to the ambient pressure (i.e., the external hydrostatic pressure due to the sea water column), i.e., at a pressure greater than the operating pressure of the oil/water separation station.

To this end, the function of the high-pressure pump 22 is to raise the pressure of the water leaving the oil/water separation station until it reaches the ambient operating pressure of the tank 20-1 before it is admitted into the latter. For example, for a water depth p of about 2000 meters (i.e., an ambient pressure of 200 bars), the operating pressure of the oil/water separation station being of the order of 80 bars, the differential pressure required by the high-pressure pump 22 is 120 bars.

Preferably, the high-pressure pump 22 is a multi-stage centrifugal coalescing pump to avoid shearing of the dispersed oil droplets by the action of the centrifugal pump impellers.

The tank 20-1 according to the invention is sized to be installed and operated on the seabed, all the time, while in pressure equilibrium with the external hydrostatic pressure (due to the sea water column). This allows for much reduced loads on the tank leading to thin walls, which facilitates both the manufacturing and installation process of the tank.

The produced water effluent from the subsea oil/water separation station 14 enters the tank 20-1 and moves through it at a very slow rate and remains inside it for a significant period of time (at least two orders of magnitude longer than in separation equipment normally used for this function). This means that the tank has a very large volume to allow its use in line with field production, in a continuous operation mode, with a long residence time (typically a minimum of 1 day).

Various materials and components may be used in the construction of the tank 20-1, namely, for example, steel or aluminum sheets (with or without internal or external reinforcing structure), polymer or rigid composite sheets (with or without internal or external reinforcing structure or internal or external steel reinforcing structure), etc. The tank comprises a rigid shell.

The detailed configuration of the tank 20-1 may vary (it may be flat parallelepipedic in shape, tubular or cylindrical in shape, or multi-cylindrical, with rigid or flexible walls, or in the shape of a very long tube, etc.), as long as the main geometrical characteristics are maintained, i.e., with a low height and a large footprint, forming a flat configuration. The configuration to be adopted will be selected according to the project data, aiming to implement an economical technical solution.

Whatever its configuration, the tank has a geometrical configuration allowing a long residence time of the water, a low migration path for the oil droplets present in the water and a large oil/water interface area in order to promote the oil/water separation by gravity.

Furthermore, the installation of the tank from the surface to the seabed will be carried out by filling it with a liquid less dense than sea water (fresh water, sea water, oil, diester, alcohol, etc.) or with sea water, an operation which may or may not be assisted by the use of floats to give the assembly positive buoyancy. The internal liquid and the floats will be recovered after installation on the seabed. Alternatively or additionally, solid floating balls inside the tank may also be used for the same purpose, i.e., they will be designed to ensure proper density management during installation to facilitate deployment at significant water depths, without the need for high-capacity lifting vessels.

Injection of solid floating balls can also be used as well as injection of liquid less dense than sea water to recover the tank during the dismantling phase.

The geometrical configuration of a tank according to a first embodiment of the invention will now be described in connection with FIGS. 3 to 6.

In this first embodiment, the tank 20-1 has a cylindrical shape with a flat floor 26, an upwardly sloping roof 28 to facilitate collection of oil droplets, a water inlet 24 that opens into the tank, an oil outlet 30 that is positioned at the sloping roof 28, and a water outlet 32.

By way of example, for 100 000 barrels per day of water to be disposed of (about 16 000 m³/day) and a residence time of one day, the dimensions of the tank could be a diameter φ of 90 m, a minimum height $H_m$ of 2 m (at the periphery) and a maximum height $H_M$ (at the center) of 4 m (the tank has the shape of a cylinder 2 m high assembled to a cone 90 m in diameter and 2 m in height).

More precisely, the water inlet 24 opens into the center of the tank via a cyclonic device 34 for imposing an initial rotation speed on the water admitted into the tank. Such a cyclonic device 34 is known per se and will therefore not be described in detail. It promotes an initial separation of the oil and the dispersed sediments. The initial rotation speed inside the tank is also intended to avoid certain dead volumes (due to short fluid circuits) inside the tank.

Figure 4:
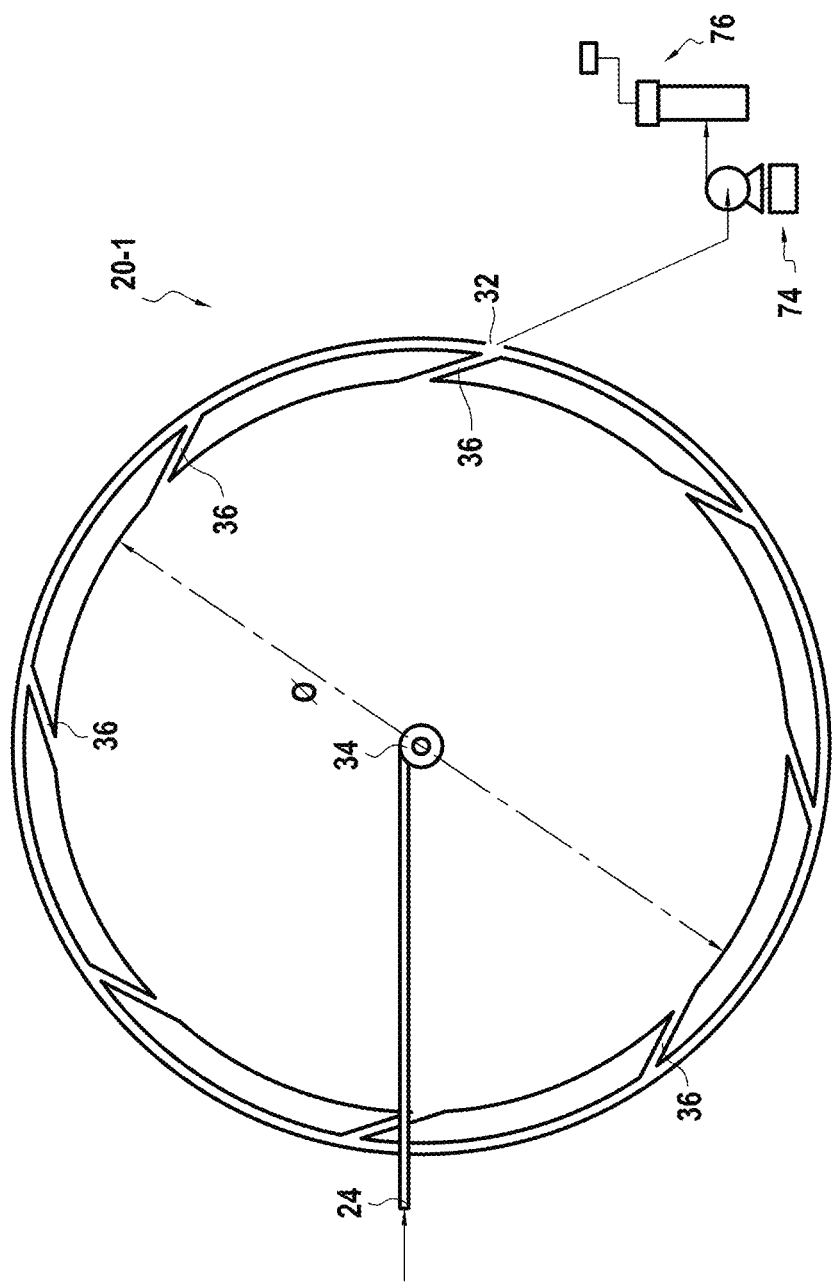
FIG. 4 is a cross-sectional view of the tank of FIG. 2.

As shown in FIG. 4, the water is discharged by means of a plurality of scoops 36 formed at the periphery of the tank, which open into the tank in tangential directions, and which open toward the water outlet 32. In particular, these scoops 36 have tangential directions which allow the rotational movement imposed on the water by the cyclonic device 34 to be maintained.

Furthermore, the tank 20-1 also comprises, at the top (i.e., at the highest part of its roof 28), an oil droplet collection device 38 (hereinafter referred to as a skimmer) which opens toward the oil outlet 30 of the tank.

It should be noted that no internal tank structure is necessary to allow the oil droplets to reach the skimmer 38 positioned at the top point of the tank. Indeed, the oil droplets rise by gravity toward the roof 28 of the tank and the slope of the latter allows them to be directed toward the skimmer.

The skimmer 38 is advantageously coupled to means for periodically discharging the skimmed oil. More precisely, oil accumulated in the skimmer is periodically (and automatically) removed therefrom via a network of suction pipes 40 which open into the skimmer.

It will be noted that no active device is required for this discharge of the skimmed oil. Only an "on-off" valve 42 upstream of the connection of the suction pipe network 40 to the multiphase flow line on the side heading toward the surface is necessary to allow this periodic suction operation of the skimmed oil volume. In particular, the oil entrainment force is achieved by the pressure difference between the pressure inside the tank (corresponding to the subsea hydrostatic pressure on the seabed) and the operating pressure of the multiphase flow line which is lower to allow for increased oil recovery from the tank.

The tank 20-1 further comprises, at the bottom, means for collecting and periodically discharging solid particles 44 which may possibly be deposited on the floor 26 of the tank.

These solid particles 44 are typically solid residual sediment (namely sand) that is settled inside the tank due to the long residence time of the water. These particles are small in quantity and very small in size (most of the sand in the produced water having been treated upstream of the tank).

Figure 5:
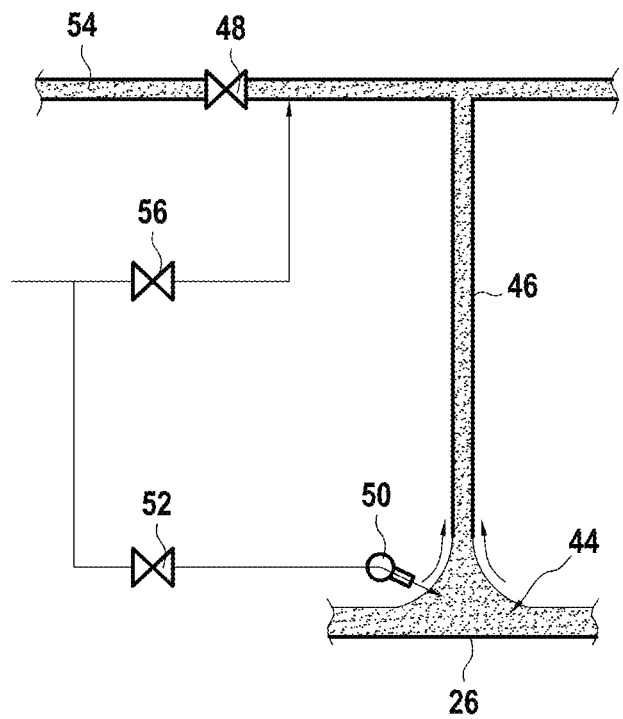
FIG. 5 shows in detail an example of collecting and discharging solid particles from the tank of FIG. 2.

As shown in FIG. 5, the means for collecting and periodically discharging solid particles may include a network of suction pipes 46 which are controlled by a valve 48, and water injection nozzles 50 which inject pressurized water toward the floor 26 of the tank.

Specifically, the suction pipes 46 are distributed over the entire surface of the floor 26 of the tank (see FIGS. 2 and 3) and the water injection nozzles 50 are fed with water from the high-pressure pump 22 via a valve 52 and are suitably distributed a short distance from the tank floor.

Moreover, similar to the above-mentioned suction relating to the accumulated oil disposal procedure, no active device is required to remove solid particles 44. Only an "on-off" valve 48 upstream of the connection of the suction pipe network 46 to a branch line 54 connected to the multiphase flow line (riser 16) on the surface side is required to enable the periodic suction operation, the entrainment force being the pressure difference between the pressure inside the tank (corresponding to the subsea hydrostatic pressure on the seabed) and the lower operating pressure of the multiphase flow line.

Furthermore, it may be provided to inject pressurized water into the multiphase flow line 54 upstream of the valve 48 prior to its opening, which pressurized water also comes from the outlet of the high-pressure pump 22 via a valve 56.

Figure 6:
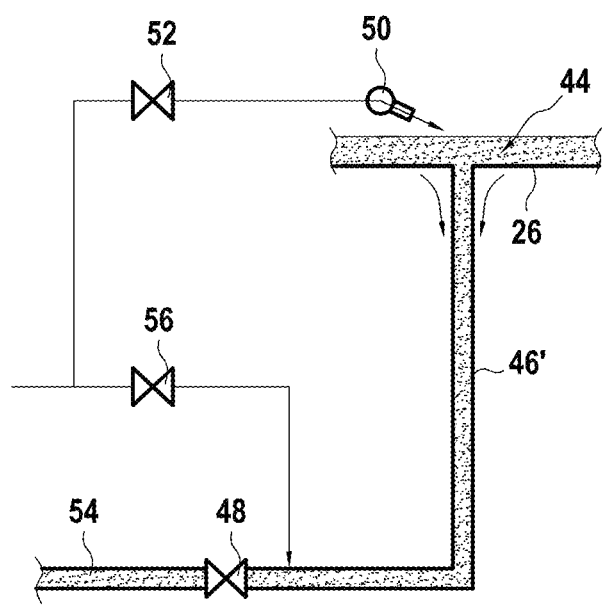
FIG. 6 shows in detail another example of collecting and discharging solid particles from the tank of FIG. 2.

In an alternative embodiment shown in FIG. 6, the suction pipes 46' of the periodic solid particle collection and discharge means 44 are external to the tank, i.e., they are located under the floor 26 of the tank outside the tank.

In this alternative embodiment, the operation of the solid particle discharge remains identical to that described in connection with FIG. 5.

Figure 7:
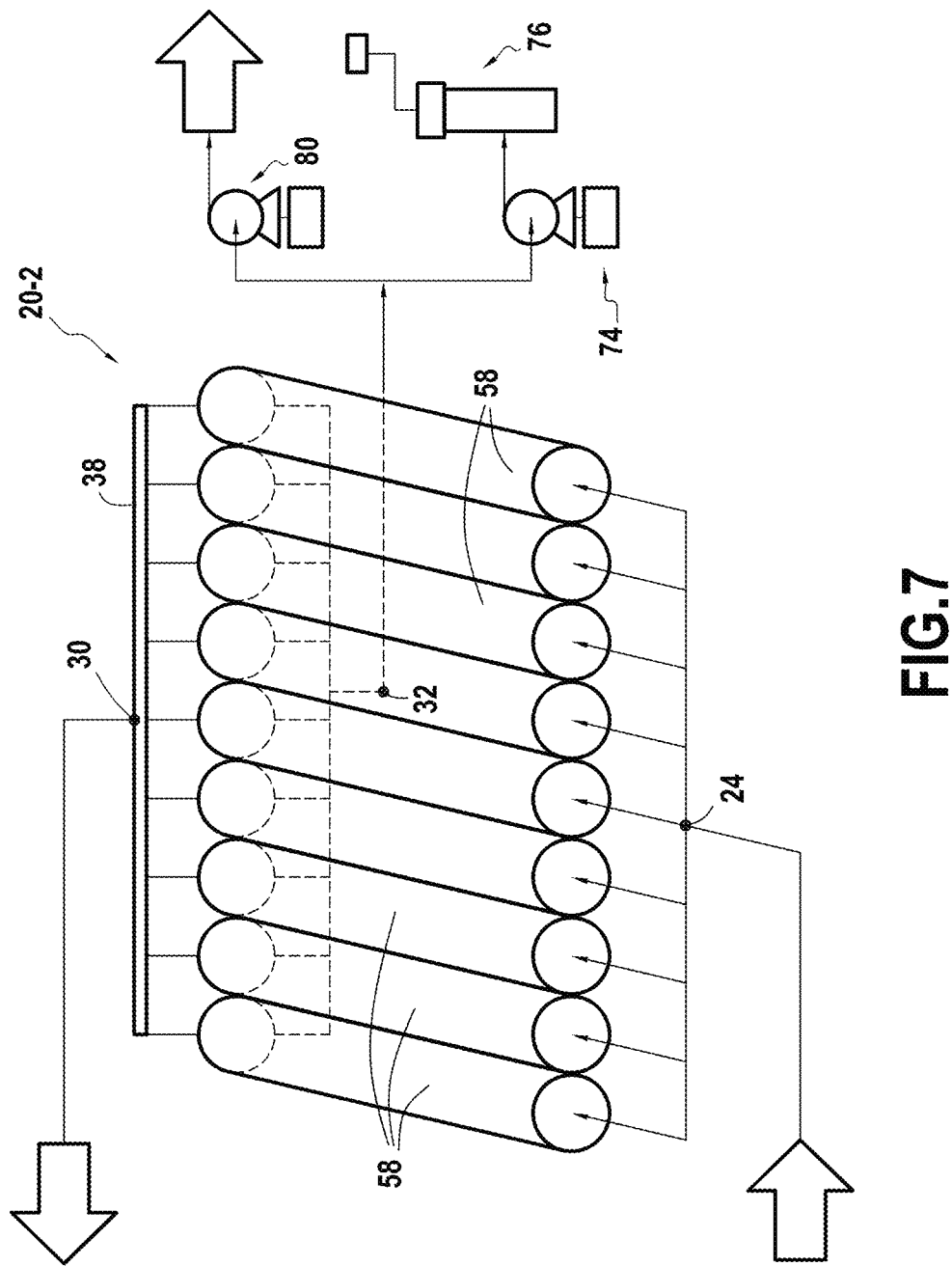
FIG. 7 shows a subsea produced water disposal facility according to another embodiment of the invention.

The geometrical configuration of a tank according to a second embodiment of the invention will now be described in connection with FIGS. 7 to 8.

In this second embodiment, the tank 20-2 has an assembly of a plurality of juxtaposed pipes 58 (or pipe sections) of large diameter (typically greater than 3 m) and long length (typically a few hundred meters) that are arranged parallel to each other.

The size and number of pipes 58 are determined according to the flow rate of the produced water to be treated for a specific application. By way of example, for 100 000 barrels per day of water to be disposed of (about 16 000 $m^3$/day) and a residence time of one day, there may be 10 juxtaposed pipes, each with a diameter of 4 m, and a length of 135 m.

The water inlet 24 of the tank 20-2 is located at one inlet end of each pipe 58, and the oil outlet 30 and water outlet 32 of the tank are located at the opposite end of the pipes (called the outlet end).

As in the first embodiment previously described the oil outlet 30 is at the top of the pipes 58 at the same end thereof through an oil droplet collection device 38 (or skimmer) and means for periodically discharging the skimmed oil (not shown in the figure).

Similarly, the tank 20-2 may further comprise means for collecting and periodically discharging solid particles that may have settled at the bottom of the pipes 58 of the tank.

In this second embodiment, such collection means (not shown) are in the form of the means described in connection with FIG. 6 (i.e., with the suction pipes located outside the tank pipes).

Furthermore, the seabed on which the tank 20-2 rests advantageously has a slight horizontal slope so that the pipes 58 can be made to rest so that their outlet end (that provided with the oil outlet 30 and water outlet 32) is inclined upwards with respect to their inlet end (that provided with the water inlet 24).

In other words, it is advantageous to exploit the slope of the seabed to slightly tilt the tank pipes upwards in the direction of water flow. This upward slope thus facilitates the collection of oil at the outlet end of the pipes.

In the absence of a seabed with a slight horizontal slope (the case of a seabed on which the tank rests which is horizontal), it is possible to make the tank pipes rest on the seabed by means of tilting means so that their outlet end is inclined upwards with respect to their inlet end.

Figure 8:
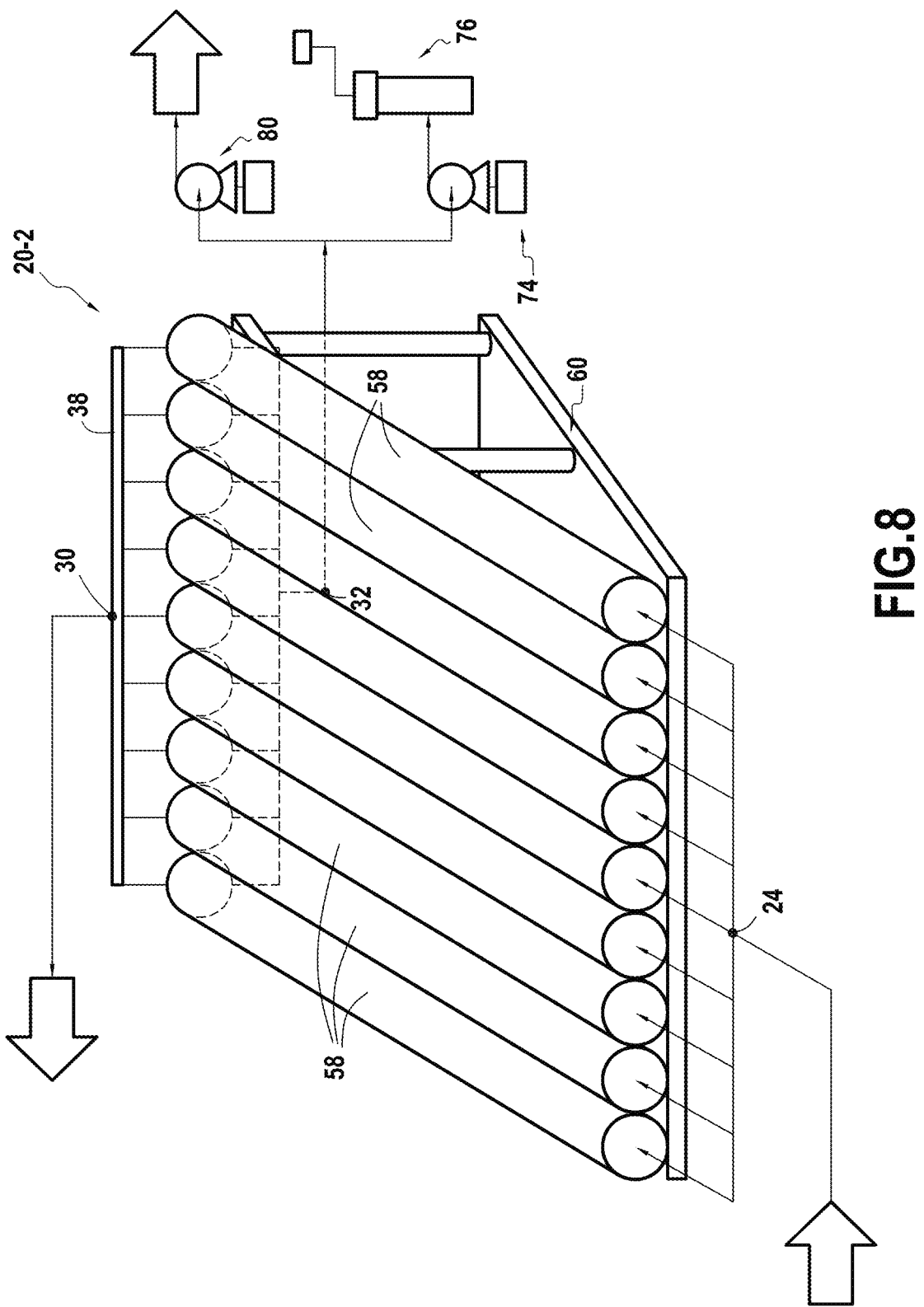
FIG. 8 is an alternative embodiment of the tank of FIG. 7.

The alternative embodiment of FIG. 8 is an example of the implementation of tilting means.

In this alternative embodiment, the tank 20-2 is identical to that described in connection with FIG. 7 with its juxtaposed pipes 58 of large diameter and long length.

Compared with the embodiment described in connection with FIG. 7, the tank pipes 58 here rest on a rigid support structure 60 giving an incline to the pipes in the direction of water flow.

It will be noted that the pipes 58 of the tanks 20-2 described in connection with FIGS. 7 and 8 may have a circular cross-section as shown in those figures. Alternatively, in an alternative embodiment not shown in the figures, the tank pipes have a square or rectangular cross-section.

In connection with FIG. 9, an alternative embodiment of this second embodiment of the tank according to the invention will now be described.

In this alternative embodiment, the tank 20-2 still has an assembly of a plurality of juxtaposed pipes 58 of large diameter and long length that are arranged parallel to each other (the other elements of the tank are not shown in FIG. 9).

In this alternative embodiment, the pipes 58 are held inclined in the direction of water flow by systems for anchoring 62 to the seabed 12 at their inlet end, and by float systems 64 connected to their outlet end to incline them upwards relative to the inlet ends.

Here, in other words, the pipes 58 in the tank are given a catenary shape by the use of floats and anchoring systems.

In connection with FIG. 10, the geometrical configuration of a tank 20-3 according to a third embodiment of the invention will now be described.

In this third embodiment, the tank 20-3 comprises a single pipe 66 of large diameter (typically greater than 3 m) and very long length (typically several hundred meters to several kilometers).

The size of the pipe 66 is determined according to the flow rate of produced water to be treated for a specific application. By way of example, for 100 000 barrels per day of water to be disposed of (about 16 000 m$^3$/day) and a residence time of one day, the pipe 66 may have a diameter of 4 m and a length of 1350 m.

The water inlet 24 of the tank 20-3 is located at an inlet end of the pipe 66 which is anchored to the seabed 12 by mooring systems 68, and the oil outlet 30 and water outlet 32 of the tank are located at the opposite end of the pipe (outlet end) which is connected to floats 70 to give the pipe a catenary shape.

In connection with FIG. 11, the geometrical configuration of a variant of the tank according to the third embodiment of the invention will now be described.

In this alternative embodiment, the tank 20-3 further comprises a single pipe 66' which does not extend in a single direction but has a serpentine shape. The water inlet 24 of the tank 20-3 is always located at an inlet end of the pipe 66', and the oil outlet 30 and water outlet 32 of the tank are located at the opposite end of the pipe (outlet end).

The footprint of the facility can thus be reduced.

In connection with FIG. 12, the geometrical configuration of a tank according to a fourth embodiment of the invention will now be described.

In this fourth embodiment, the tank 20-4 has an assembly of a plurality of juxtaposed pipes 72 (or pipe sections) of large diameter (typically greater than 3 m) and long length (typically a few hundred meters) that are arranged in loops.

The size and number of pipes 72 are determined according to the flow rate of the produced water to be treated for a specific application.

Furthermore, the water inlet 24 of the tank 20-4 is located at one inlet end of each pipe 72, and the oil outlet 30 and water outlet 32 of the tank are located at the opposite end of each pipe.

More precisely, depending on the tilt of the pipe loops 72, the oil outlet 30 may be at the level of the pipe loop (case of FIG. 12—tilt toward the top of the tank) or at the level of the bottom of the loops (case of a tilt toward the bottom of the tank—not shown in the figures).

Figure 11:
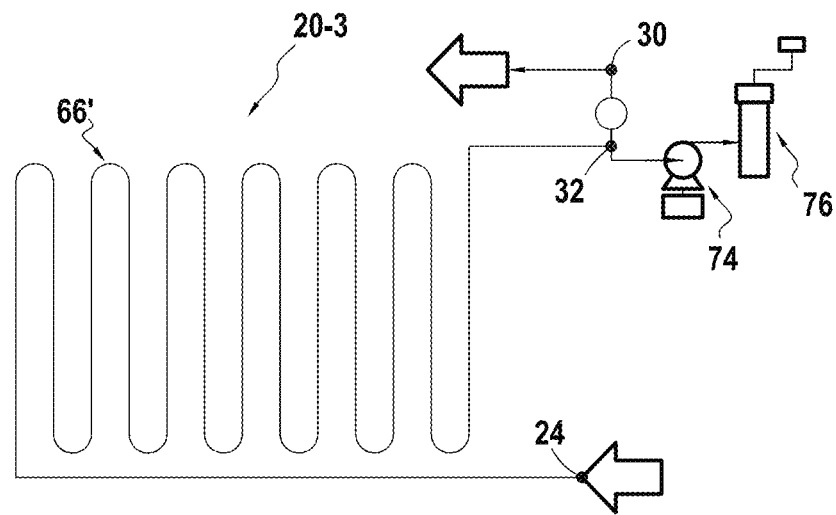
FIG. 11 shows a tank of a subsea produced water disposal facility according to an alternative embodiment of FIG. 10.
Figure 12:
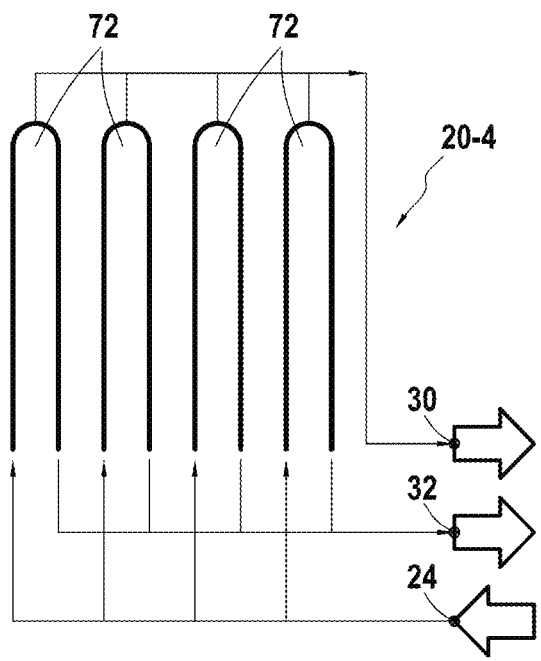
FIG. 12 shows a tank of a subsea produced water disposal facility according to yet another embodiment of the invention.

In an alternative of FIGS. 11 and 12 not shown in the figures, the pipe(s) may be spiral shaped.

Figure 13:
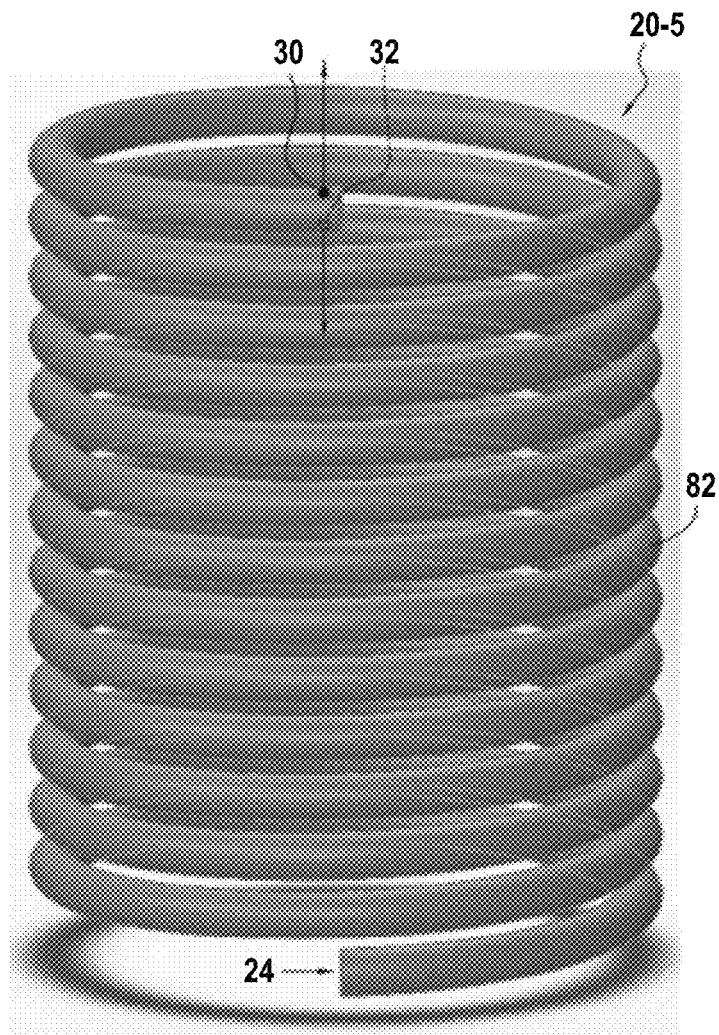
FIG. 13 shows a tank of a subsea produced water disposal facility according to yet another embodiment of the invention.

In connection with FIG. 13, the geometrical configuration of a tank according to a fifth embodiment of the invention will now be described.

In this fifth embodiment, the tank 20-5 comprises a single helix-shaped pipe 82. The diameter and length of this helix-shaped pipe depends on the flow rate of water to be treated. For example, the pipe 82 may have a diameter of 3.5 m and be wound on a cylinder 46 m in diameter and 42 m in height, which represents a flow rate of about 100 000 barrels per day of water to be disposed of (about 16 000 m$^3$/day).

In this embodiment, the water inlet 24 of the tank 20-5 is always located at an inlet end of the pipe 82, and the oil outlet 30 and water outlet 32 of the tank are located at the opposite end of the pipe (outlet end).

In the embodiments described in connection with FIGS. 7 to 13, the pipe(s) is/are made from polymeric plastic materials, such as Weholite® brand high-density polyethylene or the like.

In this case, the inner wall of the pipe(s) could be coated with a material suitable for contact with the solvents contained in the oil (mainly aromatic cuts), such as Teflon®.

Figure 14:
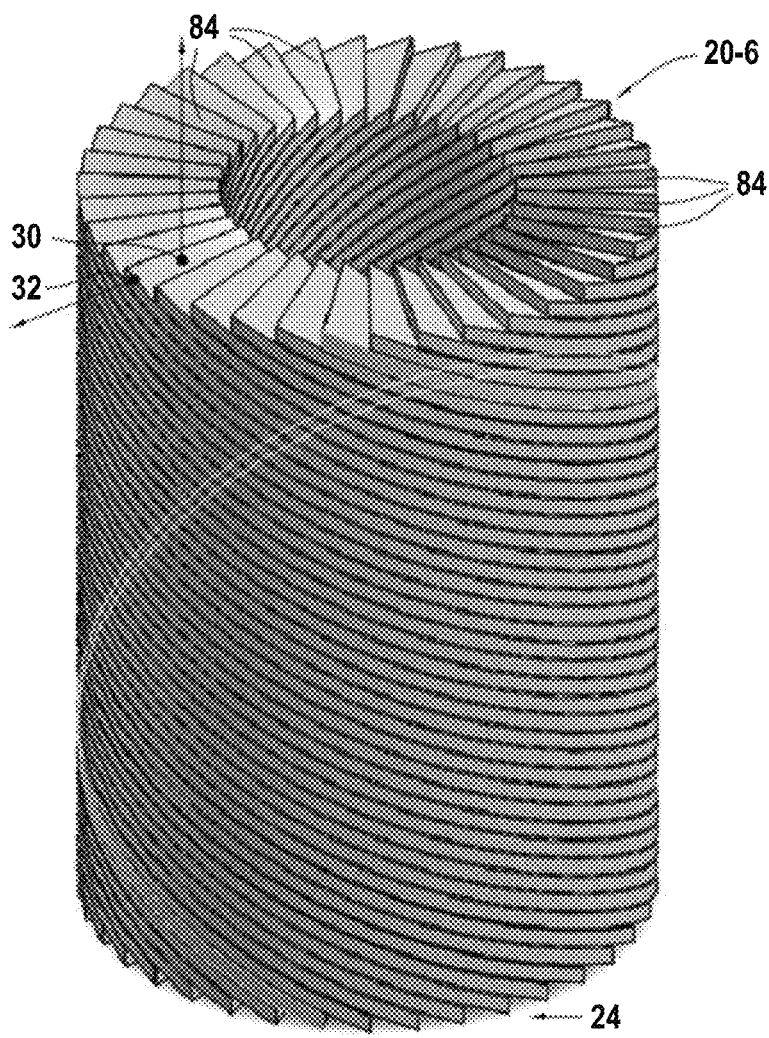
FIG. 14 shows a tank of a subsea produced water disposal facility according to yet another embodiment of the invention.

In connection with FIGS. 14 and 15, the geometrical configuration of a tank according to a sixth embodiment of the invention will now be described.

In this sixth embodiment, the tank 20-6 comprises a plurality of channels 84 of parallelepipedal cross-section that are arranged in a helix. The dimensions of the channels and of the helix that they form depend on the flow rate of water to be treated. By way of example, the channels 84 may each have a height of 0.5 m and a width of 4 m and the helix they form may be arranged on a cylinder with an internal diameter of 8 m and an external diameter of 16 m, a height of 28 m and having an angle α with the horizontal plane of 30° (see FIG. 15), which represents a total volume of about 4256 m$^3$.

Figure 15:
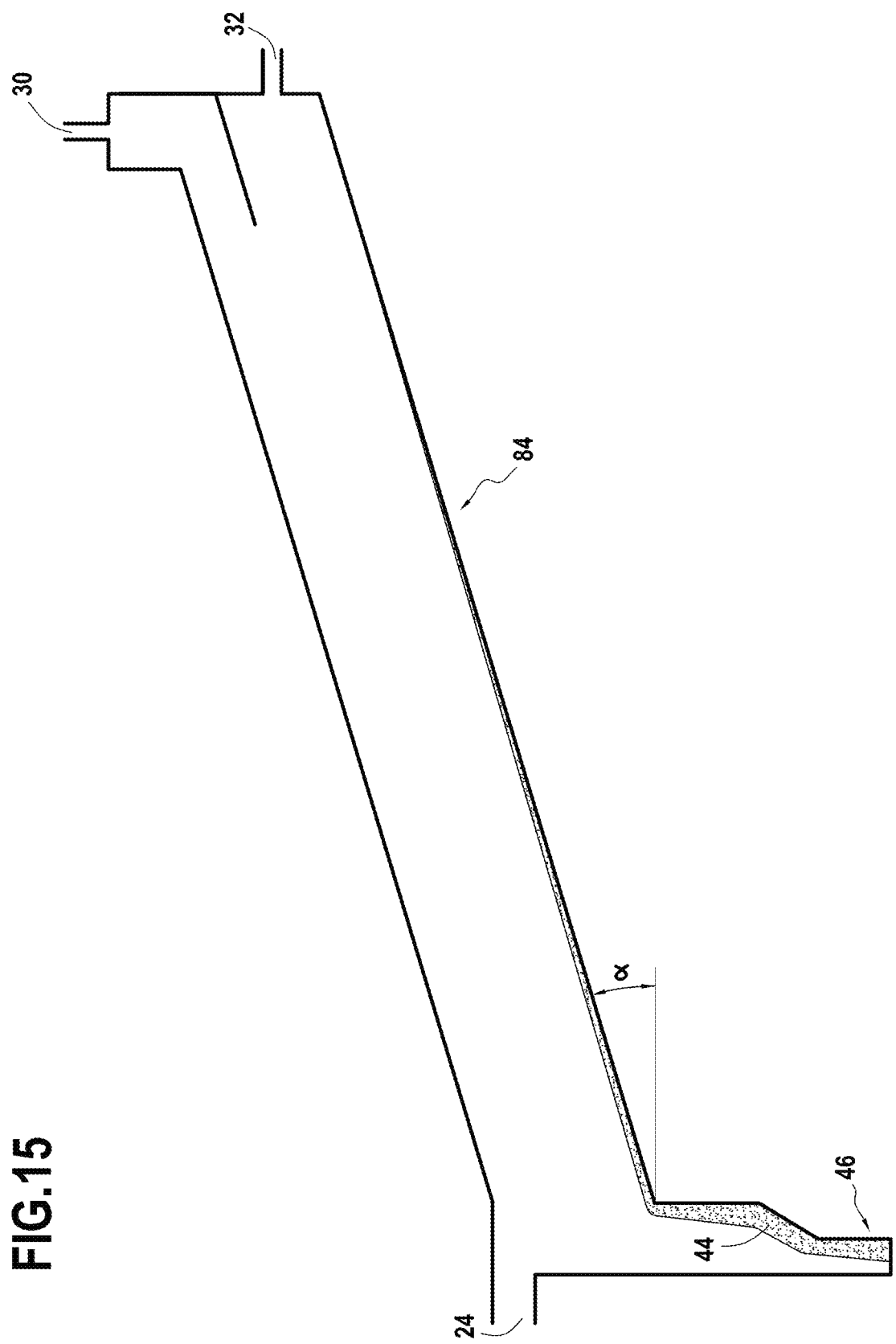
FIG. 15 shows in detail one of the channels of the tank of FIG. 14.

FIG. 15 shows in more detail one of the channels 84 of such a tank. In particular, in this embodiment, the water inlet 24 of the tank is located at one inlet end of each channel 84, and the oil outlet 30 and water outlet 32 of the tank are located at the opposite end of each channel.

Moreover, the means for collecting and periodically discharging the solid particles 44 are here realized for each channel 84 by a suction pipe 46 located at the lower part of the inlet end of the channel.

Such a tank has a number of advantages. In particular, the slope of the helix prevents the accumulation of solid particles and the formation of oil pockets. Moreover, the path of an oil drop between the inlet and outlet of the tank is minimized, which makes it possible to drastically reduce the volume of the tank for a given performance. Furthermore, because the path of the oil drops is very short, the tank can be flat and of low height.

Figure 16:
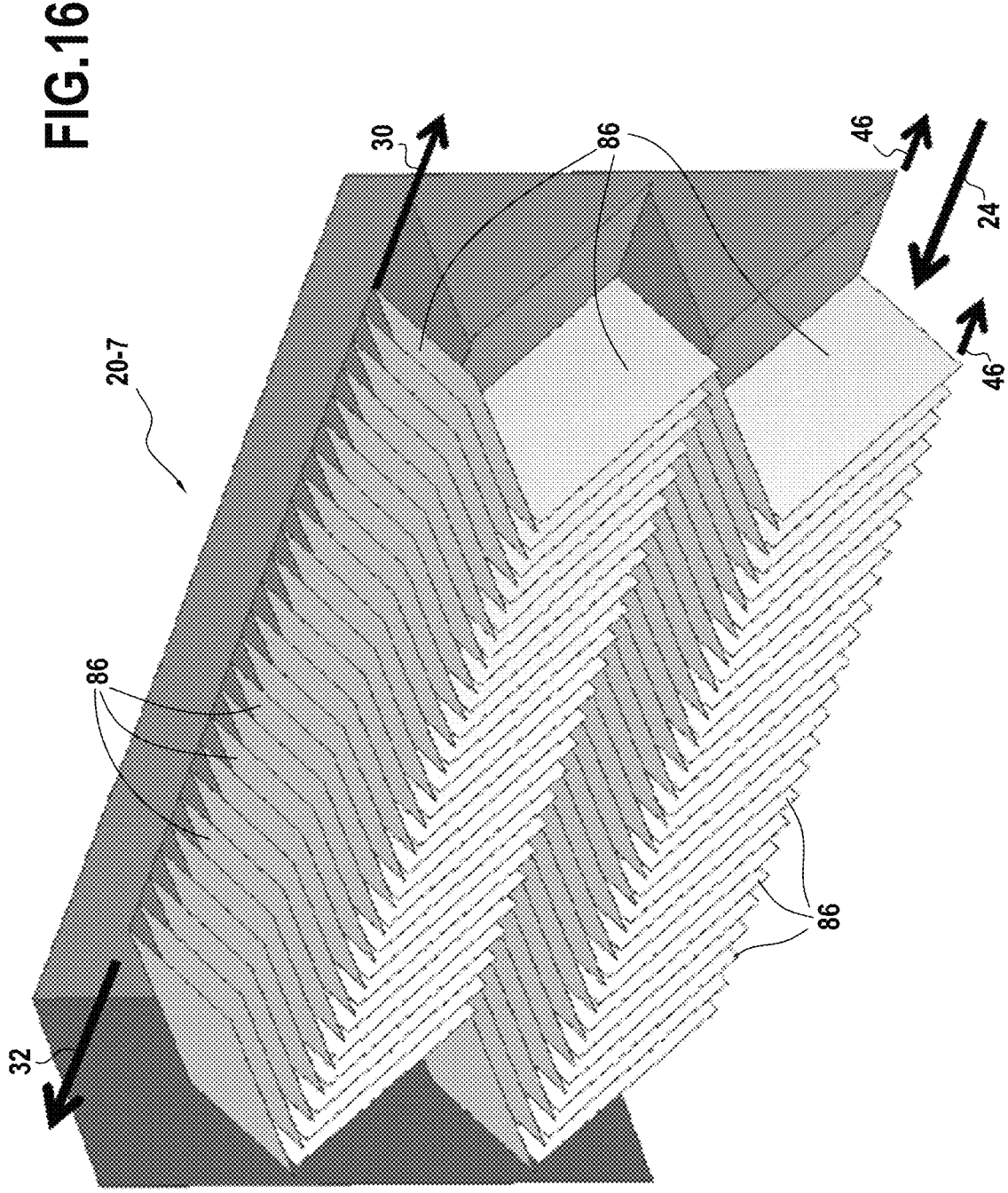
FIG. 16 shows a tank of a subsea produced water disposal facility according to yet another embodiment of the invention.

In connection with FIG. 16, the geometrical configuration of a tank according to a seventh embodiment of the invention will now be described.

In this seventh embodiment, the tank 20-7 comprises a plurality of identical tiles 86 each in the form of a dihedral, inclined at 30° to the horizontal, and arranged in four series. These tiles 86 define as many zigzag channels within which the oil droplets tend to rise and be guided by the angle of the dihedral, while the solid particles tend to fall from the edge of the dihedral faces.

By way of example, this tank 20-7 can be inscribed in a rectangular parallelepiped of 10 m in width by 44 m in length and 23 m in height, in which the tiles each have a passage section of 0.75 m in height by 11 m in width, for a developed length of 40 m. This represents a volume of 6600 m$^3$ for a volume of the parallelepiped of 10120 m$^3$.

In this embodiment, the water inlet 24 of the tank 20-7 is located at an inlet end at the bottom of the parallelepiped, and the oil outlet 30 and water outlet 32 of the tank are located at opposite ends at the top of the parallelepiped.

Moreover, the means for collecting and periodically discharging solid particles are here realized at the bottom by suction pipes 46.

Whatever the configuration of the tank, it should be noted that the water outlet of the tank may lead directly into the sea by means of a low-pressure pump 74 optionally coupled with a filtration system 76.

In this case, the filtering elements of this filtration system 76 will present a low clogging load during the operation of the facility according to the invention, due to the very low concentration of residual oil expected in the removed water, allowing a long operation campaign, before requiring a filtering element replacement. Thus, the filtration system must be designed to allow the exchange of these elements by ROV (with a tooling developed for the need), without requiring the recovery of the entire module, in order to respect the high robustness, reliability and availability of the facility according to the invention.

Alternatively, the water outlet of the tank may lead to a water injection well 7 via a high-pressure pump 80 (see FIG. 2 in particular).

The invention claimed is:

1. A facility for subsea disposal of water produced during deepwater hydrocarbon production, comprising:
   a subsea oil/water separation station fed with fluids coming directly from at least one hydrocarbon production well, operating at a pressure independent of and lower than the ambient pressure, and comprising an oil outlet for connecting to a production unit and a water outlet;
   a flat gravity oil/water separation tank resting on the seabed, continuously fed with water leaving the oil/water separation station, operating at a pressure substantially equal to the ambient pressure, and comprising an oil outlet for connecting to the production unit and a water outlet; and
   a subsea high-pressure pump connected, on the one hand, to the water outlet of the oil/water separation station and, on the other hand, to a water inlet of said tank to raise the pressure of the water leaving the oil/water separation station to the ambient pressure before the water is admitted into said tank.

2. The facility according to claim 1, wherein the flat tank has a geometric configuration that allows a long residence time of the produced water, a low migration path for the oil droplets present in the water and a large oil/water interface area in order to promote oil/water separation by gravity.

3. The facility according to claim 2, wherein the tank further comprises, at the top, an oil droplet collection device opening toward the oil outlet of the tank.

4. The facility according to claim 3, wherein the tank further comprises, at the top, means for periodically discharging the oil present at the level of the collection device.

5. The facility according to claim 4, wherein the means for periodically discharging the oil droplets comprises a network of suction pipes controlled by an on-off valve capable of opening into the collection device.

6. The facility according to claim 1, wherein the tank further comprises, at the bottom, means for collecting and periodically discharging any solid particles deposited on a floor of the tank.

7. The facility according to claim 6, wherein the means for collecting and discharging solid particles comprise a network of suction pipes controlled by a valve, and nozzles for injecting pressurized water toward the floor of the tank.

8. The facility according to claim 1, wherein the oil outlet of the tank is connected to the oil outlet of the oil/water separation station via at least one on-off valve.

9. The facility according to claim 1, wherein the water outlet of the tank opens into the sea via a low-pressure pump or opens into a water injection well via a high-pressure pump.

10. The facility according to claim 1, wherein the tank has a cylindrical shape with a flat floor, an upwardly sloping roof to facilitate the collection of oil droplets, the water inlet which opens into the tank at the center thereof via a cyclonic device to impose an initial rotation speed on the water admitted into the tank, the oil outlet which is positioned at the level of the sloping roof, and the water outlet which comprises a plurality of scoops formed at the periphery of the tank and opening into the tank in tangential directions.

11. The facility according to claim 1, wherein the tank has a plurality of pipes of large diameter and long length arranged parallel to each other, resting on a seabed, the water inlet of the tank being at a same inlet end of each pipe, and the oil outlet and the water outlet of the tank being at a same opposite outlet end of each pipe.

12. The facility according to claim 11, wherein the seabed on which the tank rests has a horizontal slope, the pipes resting on the seabed so that their outlet end is tilted upwards relative to their inlet end.

13. The facility according to claim 11, wherein the seabed on which the tank rests is horizontal, the pipes resting on the seabed via tilting means so that their outlet end is tilted upwards relative to their inlet end.

14. The facility according to claim 13, wherein the tilting means comprises supports giving a tilt to the tank pipes resting thereon.

15. The facility according to claim 13, wherein the tilting means comprises systems for anchoring to the seabed the inlet end of the pipes and float systems connected to the outlet end of the pipes to tilt them upwards relative to the inlet ends.

16. The facility according to claim 1, wherein the tank has a pipe of large diameter and very long length, the water inlet of the tank being at an inlet end of the pipe which is anchored to the seabed, and the oil outlet and the water outlet of the tank being at the opposite outlet end of the pipe which is connected to floats to give the pipe a catenary shape.

17. The facility according to claim 11, wherein each pipe has a loop, serpentine or spiral shape.

18. The facility according to claim 1, wherein the tank comprises a single pipe forming a helix, the water inlet of the tank being at one inlet end of the pipe, and the oil outlet and the water outlet of the tank being at the opposite outlet end of the pipe.

19. The facility according to claim 1, wherein the tank comprises a plurality of channels of parallelepipedal cross-section which are arranged in a helix, the water inlet of the tank being at a same inlet end of each channel, and the oil outlet and the water outlet of the tank being at a same opposite outlet end of each channel.

20. The facility according to claim 1, wherein the tank comprises a plurality of identical tiles each in the form of a dihedral, inclined at 30° to the horizontal, and arranged in several series of tiles.

21. The facility according to claim 1, wherein the high-pressure pump is a multi-stage coalescing pump.

22. The facility according to claim 1, wherein the tank comprises a rigid shell.

23. A process for subsea disposal of water produced during deepwater hydrocarbon production, comprising feeding fluids coming directly from at least one hydrocarbon production well to a subsea oil/water separation station operating at a pressure independent of and lower than the ambient pressure and continuously feeding a flat gravity oil/water separation tank resting on the seabed with produced water leaving the oil/water separation station, the produced water feeding the tank having first been pressurized to reach a pressure substantially equal to the ambient pressure.

* * * * *